US011900624B2

(12) United States Patent
Pau et al.

(10) Patent No.: US 11,900,624 B2
(45) Date of Patent: Feb. 13, 2024

(54) DIGITAL FRINGE PROJECTION AND MULTI-SPECTRAL POLARIZATION IMAGING FOR RAPID 3D RECONSTRUCTION

(71) Applicant: Arizona Board of Regents on Behalf of the University of Arizona, Tucson, AZ (US)

(72) Inventors: Stanley Pau, Tucson, AZ (US); Rongguang Liang, Tucson, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 0 days.

(21) Appl. No.: 18/183,005

(22) Filed: Mar. 13, 2023

(65) Prior Publication Data

US 2023/0342959 A1 Oct. 26, 2023

Related U.S. Application Data

(62) Division of application No. 16/770,793, filed as application No. PCT/US2018/064478 on Dec. 7, 2018, now Pat. No. 11,605,172.
(Continued)

(51) Int. Cl.
*G06T 7/521* (2017.01)
*G01B 11/25* (2006.01)
*G06T 17/00* (2006.01)

(52) U.S. Cl.
CPC .............. *G06T 7/521* (2017.01); *G01B 11/25* (2013.01); *G06T 17/00* (2013.01)

(58) Field of Classification Search
CPC .......... G06T 7/521; G06T 17/00; G01B 11/25
See application file for complete search history.

(56) References Cited

U.S. PATENT DOCUMENTS 7,609,388 B2   10/2009   Arieli et al.
9,314,150 B2   4/2016    Chen et al.
(Continued)

FOREIGN PATENT DOCUMENTS

KR        101760284 B1       7/2017

OTHER PUBLICATIONS

Blalock, Todd, "Aspheres: Finding the right tool: metrology for the manufacture of freeform optics", Laser Focus World, 2018.
(Continued)

*Primary Examiner* — Terrell M Robinson
(74) *Attorney, Agent, or Firm* — Perkins Coie LLP

(57) ABSTRACT

Methods and systems are described that enable three-dimensional (3D) imaging of objects. One example system includes a light source that produces multiple light beams having specific spectral content and polarization states. The system also includes phase masks that modify the intensity or phase of the light, and projection optics that allow simultaneously projection of at least three fringe patterns onto an object having particular phase, polarization and spectral characteristics. The detection system includes a camera that simultaneously receives light associated with the at the fringe patterns upon reflection from the object, and a processing unit coupled to the camera unit that determines one or both of a phase or a depth information associated with the object. The system and associated methods can efficiency produce 2D images of the object and allow determination of characteristics such as surface profile. The disclosed systems and methods can be effectively implemented with moving objects.

18 Claims, 9 Drawing Sheets

Related U.S. Application Data

(60) Provisional application No. 62/596,589, filed on Dec. 8, 2017.

(56) References Cited

U.S. PATENT DOCUMENTS

| | | | | |
|---|---|---|---|---|
| 2004/0212807 | A1* | 10/2004 | Hanson | G03H 1/28 356/458 |
| 2010/0253986 | A1* | 10/2010 | Awatsuji | G03H 1/0443 359/10 |
| 2010/0271922 | A1* | 10/2010 | Iwamura | G11B 7/128 |
| 2012/0229331 | A1* | 9/2012 | Bergeron | G01S 13/9005 342/25 C |
| 2014/0029012 | A1* | 1/2014 | Ogawa | G01N 21/4795 356/477 |
| 2014/0267597 | A1* | 9/2014 | Yu | G03H 1/0443 348/40 |
| 2014/0341421 | A1 | 11/2014 | Porikli et al. | |
| 2016/0290784 | A1 | 10/2016 | Wojtkowski et al. | |
| 2017/0066192 | A1 | 3/2017 | Cho et al. | |
| 2017/0322309 | A1 | 11/2017 | Godbaz et al. | |
| 2018/0284694 | A1 | 10/2018 | Park | |
| 2019/0324286 | A1* | 10/2019 | op 'T Root | H01S 3/0085 |
| 2019/0353472 | A1 | 11/2019 | Braker et al. | |
| 2020/0182988 | A1 | 6/2020 | Pau | |

OTHER PUBLICATIONS

Graves, L. R., et al., "Infinite deflectometry enabling 2π-steradian measurement range", OSA Publishing, Optics Express: 27(5): 7602-7615, Feb. 2019 (14 pages).

International Search Report and Written Opinion, dated Apr. 23, 2019, for International Patent Application No. PCT/US2018/064478, filed Dec. 7, 2018 (11 pages).

Liu, Yue, et al., "Full-field 3D shape measurement of discontinuous specular objects by direct phase measuring deflectometry", Scientific Reports: 7(10293), Aug. 2017 (8 pages).

Niu, Zhenqi, et al., "3D Shape Measurement of Discontinuous Specular Objects Based on Advanced PMD with Bi-Telecentric Lens", Optics Express 26(2): 1615-1632 (2018) (18 pages).

Wang, Daodang, et al., "Computer-Aided High-Accuracy Testing of Reflective Surface with Reverse Hartmann Test", Optics Express 24(17): 19671-19681 (2016) (11 pages).

\* cited by examiner

DIGITAL FRINGE PROJECTION AND MULTI-SPECTRAL POLARIZATION IMAGING FOR RAPID 3D RECONSTRUCTION

CROSS REFERENCE TO RELATED APPLICATIONS

This patent document is a division of U.S. patent application Ser No. 16/770,793, filed Jun. 8, 2020, which is a 371 National Phase Application of International Patent Application No. PCT/US2018/064478, filed December 7, 2018, which claims priority to the provisional application with Ser. No. 62/596,589, titled "Digital Fringe Projection and Multi-Spectral Polarization Imaging for Rapid 3d Reconstruction," filed Dec. 8, 2017. The entire contents of the above noted applications are incorporated by reference as part of the disclosure of this document.

STATEMENT REGARDING FEDERALLY SPONSORED RESEARCH

This invention was made with government support under Grant No. 1455630, awarded by NSF. The government has certain rights in the invention.

TECHNICAL FIELD

The disclosed embodiments relate to three-dimensional imaging systems, and more specifically to imaging systems that use optical fringe projection techniques.

BACKGROUND

Three-dimensional (3D) imaging techniques have applications in industrial metrology, virtual and augmented reality, remote sensing, medical diagnostic, biometrics and homeland security. To achieve 3D imaging, existing techniques, such as light detection and ranging (LIDAR), stereovision, light field or plenoptics imaging, structured light illumination and digital fringe projection (DFP), have been developed. Each of the above techniques, however, has its own advantages and disadvantages. The ideal 3D imaging instrument should be fast, portable, and compact with low power consumption. LIDAR, structured light illumination and DFP often require scanning and acquisition of multiple frames. Stereovision requires more than one camera at different locations to provide accuracy. Plenoptics imaging requires complex algorithms and computation hardware for 3D reconstruction; in addition, the spatial resolution is reduced. Therefore, there is a need for an improved 3D imaging system that can allow characterization of the objects with a higher speed and a lower computational cost.

BRIEF DESCRIPTION OF THE DRAWINGS

FIG. 8($b$) illustrates another fringe production configuration that uses multiple optical fibers and splitters in accordance with another exemplary embodiment.

DETAILED DESCRIPTION

In the following description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

The disclosed embodiments relate to methods, devices and systems that apply digital fringe projection (DFP) techniques to facilitate the generation of three-dimensional (3D) images of an object based on the measurement of polarizations and/or colored light in a single shot. Unlike the conventional techniques, which utilize sequential measurements, the disclosed techniques acquire all relevant information in a single shot and can be applied to rapidly changing scenes and objects. Moreover, the disclosed techniques enable 3D imaging of objects with a higher dynamic range, and can further provide information regarding material characteristics of the object.

Figure 1:
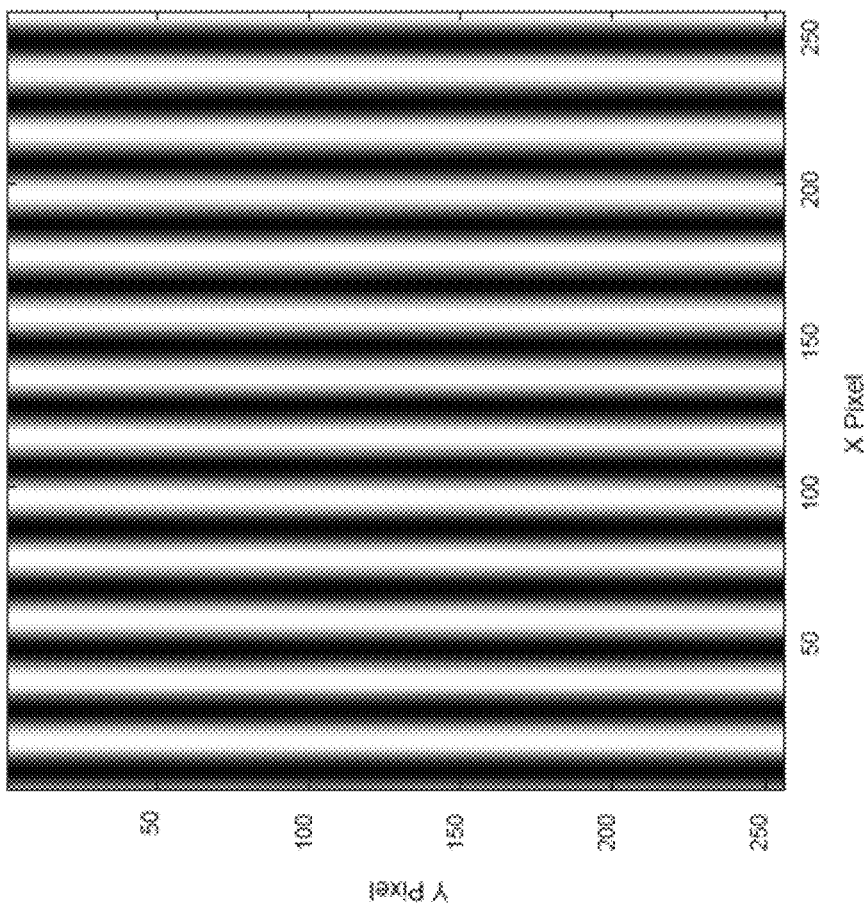
FIG. 1 illustrates an example of a periodic fringe pattern on an array having 256 by 256 pixels.

DFP methods typically utilize a projector, such as a digital light processing (DLP), liquid crystal display (LCD) or a liquid crystal on silicon (LCoS) projector, to project computer generated fringe patterns onto an object. As noted above, conventional DFP techniques sequentially project fringes onto the object, capture the image, and process the image data. The equations that follow are helpful in facilitating the understanding of DFP projection and detection. In particular, the intensity, I, of a fringe can be described as:

$$I(i, j) = I_0\left(1 + \cos\left(\frac{2\pi j}{P} + \theta\right)\right), \quad (1)$$

where (i,j) denotes the index of the projector pixel, $I_0$ is the maximum intensity of the source, P is the period (or spacing) of the fringe pattern and $\theta$ is a phase shift. FIG. 1 shows an example of a periodic fringe made of 256 by 256 pixel array.

In operation, the fringe pattern is projected onto an object, and the reflected images from the object are measured using a camera. The depth of the object at each pixel is calculated from the phase, φ(k, l), where (k, l) denotes the index of the camera pixel. A minimum of three fringe patterns is needed for the reconstruction.

For N fringe patterns, the intensity pattern measured by the camera is given by $$I_m(k, l) = I_{DC}(k, l) + I_{AC}(k, l)\cos(\varphi(k, l) - \delta_m), \quad (2)$$

$$\delta_m = m\frac{2\pi}{N}; m = 1, 2, \ldots, N, \quad (3)$$

where $I_{CD}(k, l)$ and $I_{AC}(k, l)$ are the offset intensity and periodic intensity at camera pixel (k, l) as a function of different fringe patterns with phase $\delta_m$.

The measured phase, φ(k, l), at each pixel is related to the intensity reflected from the object at each pixel (k, l), allowing the phase $\delta_m$ to be calculated as:

$$\varphi(k, l) = \tan^{-1}\left(\frac{-\sum I_m \sin(\delta_m)}{\sum I_m \cos(\delta_m)}\right). \quad (4)$$

When N=3, i.e., three fringe patterns are projected, $$\varphi(k, l) = \tan^{-1}\left(\frac{\sqrt{3}(I_2 - I_3)}{-2I_1 + I_2 + I_3}\right); \delta_i = (i - 1)\frac{2\pi}{3}. \quad (5)$$

When N=6, i.e., six fringe patterns are projected, $$\varphi(k, l) = \tan^{-1}\left(\frac{\sqrt{3}(I_2 + I_3 - I_5 - I_6)}{2I_1 + I_2 - I_3 - 2I_4 - I_5 + I_6}\right); \delta_i = (i - 1)\frac{\pi}{3}. \quad (6)$$

The depth, d(k, l), at each pixel is related to the phase by:

$$\varphi(k, l) = \frac{2\pi d(k, l)}{P_o}. \quad (7)$$

Subsequently, a 3D depth map of an object is determined from the calculated d(k, l). It should be noted that in a conventional 3D reconstruction, multiple fringe patterns are first projected onto an object sequentially at different times; that is, fringes of different phase $\delta_m$ are projected sequentially onto an object. However, as noted above, such conventional techniques suffer from many shortcomings, including an inability to provide 3D reconstruction for rapidly moving objects in a cost-effective way. In particular, since at least three phase-shifted fringes are needed, the projection followed by collection of corresponding images can be challenging, particularly for rapidly moving dynamic objects. Moreover, the conventional techniques fail to provide additional information regarding the object, such as color or polarization properties, and do not provide accurate information for high dynamic range objects. As will be described in further detail below, the disclosed embodiments, among other features, overcome these issues by projecting multiple fringes at different wavelengths and/or polarizations simultaneously onto the object, and simultaneously capture and process the image data corresponding to the projected fringes.

Figure 2:
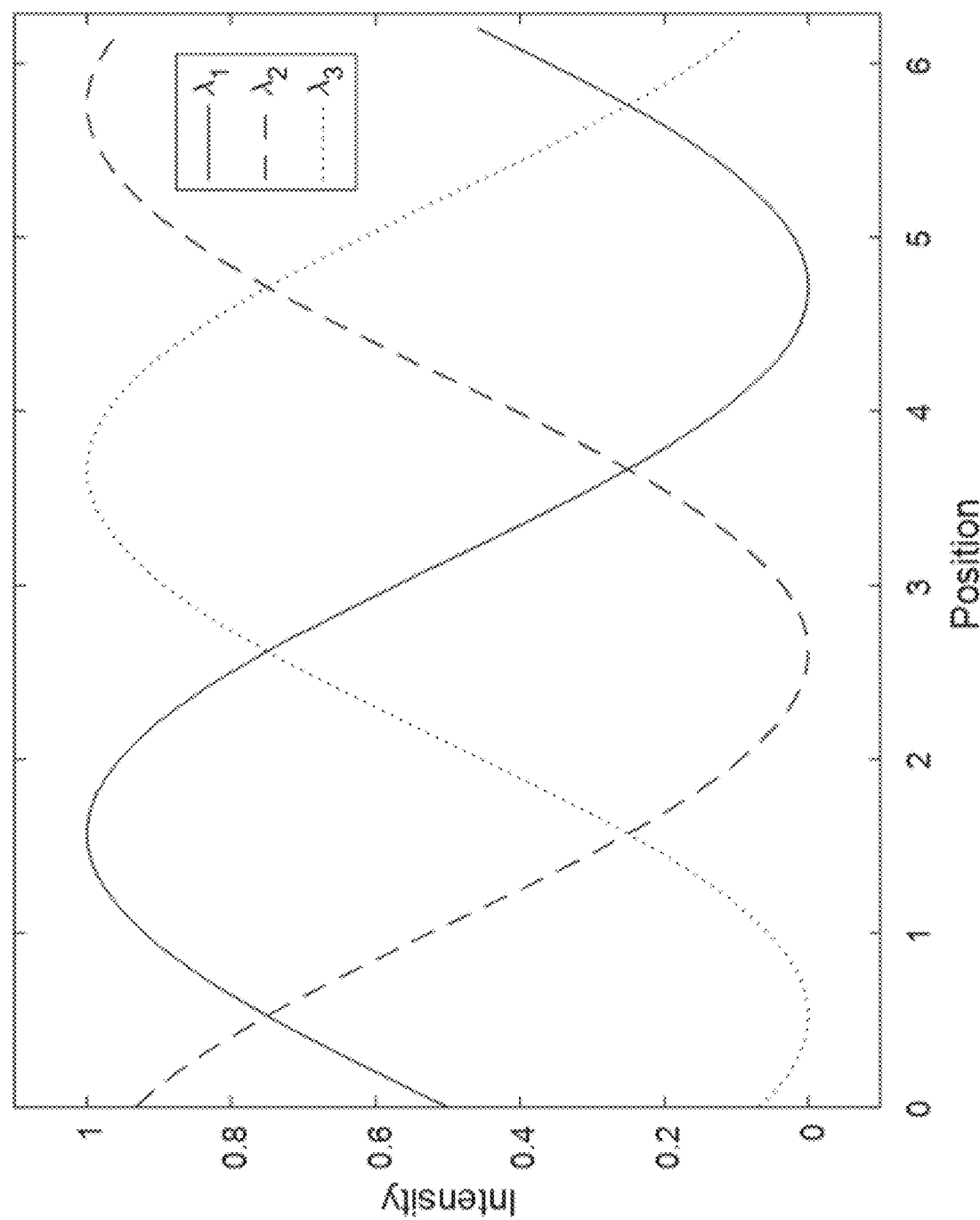
FIG. 2 illustrates plots of intensity versus position for three periodic fringes having the same spatial periodicity but different phases and wavelengths in accordance with an exemplary embodiment.

FIG. 2 illustrates plots of intensity versus position for three periodic fringes having the same spatial periodicity but different wavelengths and phases in accordance with an exemplary embodiment. The wavelength of incident light, denoted by wavelengths $\lambda_1$, $\lambda_2$ and $\lambda_3$, is different for each projected fringe pattern. For the purpose of illustration and not by limitation, three wavelengths or colors are used, but fringes at additional wavelengths can be projected in conformance with the principles of the disclosed technology. In some embodiments, such additional fringes can be used to increase the accuracy of the measurements. In a three-step phase-shifting example implementation, the intensity of the three fringes measured by the camera can be described as:

$$I_{\lambda 1}(k, l) = I_{DC1}(k, l) + I_{AC1}\cos(\varphi(k, l) - 2a) \quad (8)$$

$$I_{\lambda 2}(k, l) = I_{DC2}(k, l) + I_{AC2}\cos(\varphi(k, l) - a) \quad (9)$$

$$I_{\lambda 3}(k, l) = I_{DC3}(k, l) + I_{AC3}\cos(\varphi(k, l)), \quad (10)$$

where a is a constant phase offset. The phase is related to the fringe intensity by the following relationship:

$$\varphi(k, l) = \tan^{-1}\left(\frac{\sqrt{3}(I_{\lambda 1} - I_{\lambda 3})}{2I_{\lambda 2} - I_{\lambda 1} - I_{\lambda 3}}\right). \quad (11)$$

Similar to relationship in Equation (7), a depth map can be calculated from the computed phase of Equation (11). One of the advantages of the above technique is that the depth map can be reconstructed in a single shot. One potential challenge associated with this technique is that the reflectance of an object is generally wavelength dependent; as such, calibration of the fringe pattern at different colors must be performed in order to accommodate such variability in reflectance. In some embodiments, the effects of variations in reflectance can be mitigated or minimized by using multiple sources (e.g., lasers) that have closely spaced wavelengths. For many applications, the wavelengths can be near infrared color bands, where the projected light is invisible to the human eye. The near infrared wavelengths can be closely spaced, such that the same type of semiconductor laser can be used to provide the projected fringes. In some embodiments, the wavelength separation is in the range of 5 to 50 nm. In one example embodiment, the wavelength separation is 5 nm. In some example implementations, a vertical-cavity surface-emitting laser (VCSEL) with InGaAs quantum well as gain material is used as the light source. In such implementations, the wavelength is determined by the size of the laser cavity. Thorlabs' 200 mW VCSEL, part numbers L840P200 and L850P200, are examples of two light sources having wavelengths of 840 nm and 850 nm, respectively. In some example implementations, a high power NIR LED is used as the light source.

Figure 3:
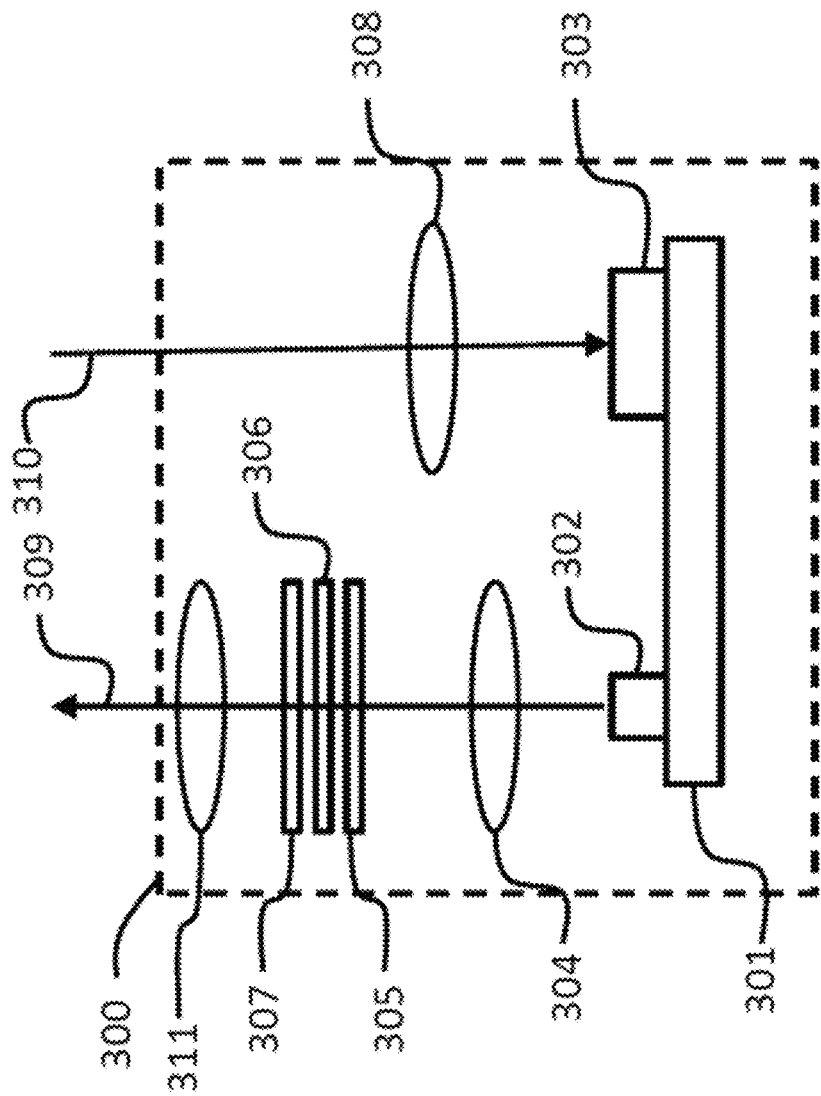
FIG. 3 illustrates a system that can be used to produce three-dimensional images of an object in accordance with an exemplary embodiment.

FIG. 3 illustrates a system 300 that can be used for 3D imaging of an object in accordance with an exemplary embodiment. The system 300 includes a light source 302 that is configured to generate light in three separated bands. For example, the light source 302 can include three individual light sources, or a single light source that includes additional filters or other components that enable the generation of light at three different wavelengths or range of wavelengths. In one example, the light source 302 includes one or more lasers. In another example, the light source 302 includes one or more LEDs. The light source 302 is connected to a controller and power supply 301. The output of the light source 302 is collimated by collimation optics 304 and passes through intensity masks, 305, 306 and 307 of different wavelength and phase. The masks, 305, 306 and 307 can, for example, be interference filters, each having a particular reflection/transmission characteristic that allows projection of a shifted fringe at a first wavelength (or range of wavelengths) relative to another fringe at a second wavelength (or range of wavelengths). In some embodiments, the masks are fabricated using patterned or etched dichroic filters; each dichroic filter can be designed to operate at the wavelength of interest. The light exiting the masks 305, 306 and 307 comprises fringes of different color and phase, and passes through a zoom lens 311 which controls the magnification of the fringes and produces an output light 309 that is projected onto an object (not shown). The reflected light 310 is collected by collection optics 308 and detected by a sensor 303, such as an array sensor, typically a CCD or CMOS array with pixelated color filter for the wavelength(s) of interest.

Figure 4:
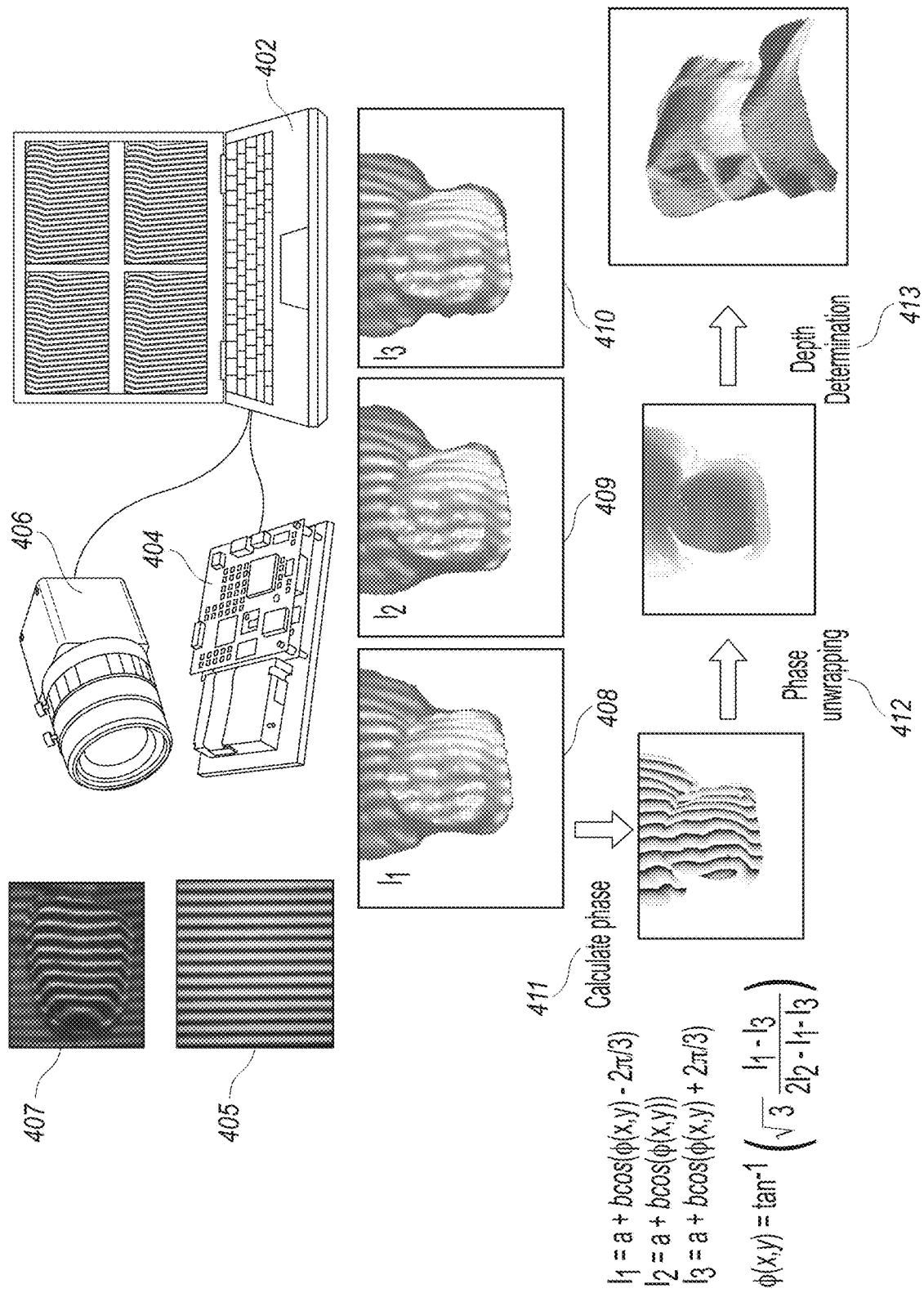
FIG. 4 illustrates a digital fringe projection system and associated operations in accordance with an exemplary embodiment.

FIG. 4 illustrates a digital fringe projection system and associated operations in accordance with an exemplary embodiment. The components in the exemplary diagram of FIG. 4 include an electronic device such as a laptop 402 (including a processor and a memory, among other components) that is used to drive a projection device 404. The projection device 404 includes the projection-side components, such as all or some of the components identified as components 301, 304 to 307 and 311 in FIG. 3, that are configured to project multiple simultaneous fringes onto the object of interest (not shown). One exemplary fringe pattern 405 that is output from the projection device 404 is shown in FIG. 4. In some embodiments, the projection device 404 is configured to operate under the control of the laptop 402. In some embodiments, the laptop (or equivalent control system) can be incorporated as part of the projection device 404. A camera module 406 captures the images of the fringes that are projected onto the object. One exemplary fringe pattern 407 that is captured by the camera module 406 is shown in FIG. 4. The camera module 406 can include some or all of the components identified as 308, 303 or 301 in FIG. 3. The camera module 406, which is sensitive to different wavelengths, processes the collected images (alone or in cooperation with the laptop 402), and produces three intensity values associated with fringe patterns 408, 409 and 410 (each corresponding to a particular wavelength or range of wavelengths). Next, the phase is computed (411), phase unwrapping (if needed) is performed (412), and a depth map is produced (413).

Phase unwarping can be carried out using an appropriate algorithm or procedure to produce the correct phase values. For example, one phase unwrapping technique can include applying a Gaussian filter to remove the random noise, detecting the incorrectly unwrapped points based on phase monotonicity, unwrapping the shortest wavelength phase without smoothing for the final measurement, detecting holes that should be filled and fill them. The unwrapped phase is then used to calculate the coordinates.

Another aspect of the disclosed embodiments relates to a projector and camera system that projects and detects polarized fringes of different wavelengths. In one embodiment, a projector is used to project three fringe patterns at three different wavelengths, all at a first polarization state. A second projector is used to project three fringe patterns at the same three wavelengths but at a second polarization state that is, for example, orthogonal to the first polarization state. For instance, the polarization state can be linear, circular or elliptical polarization states.

Figure 5:
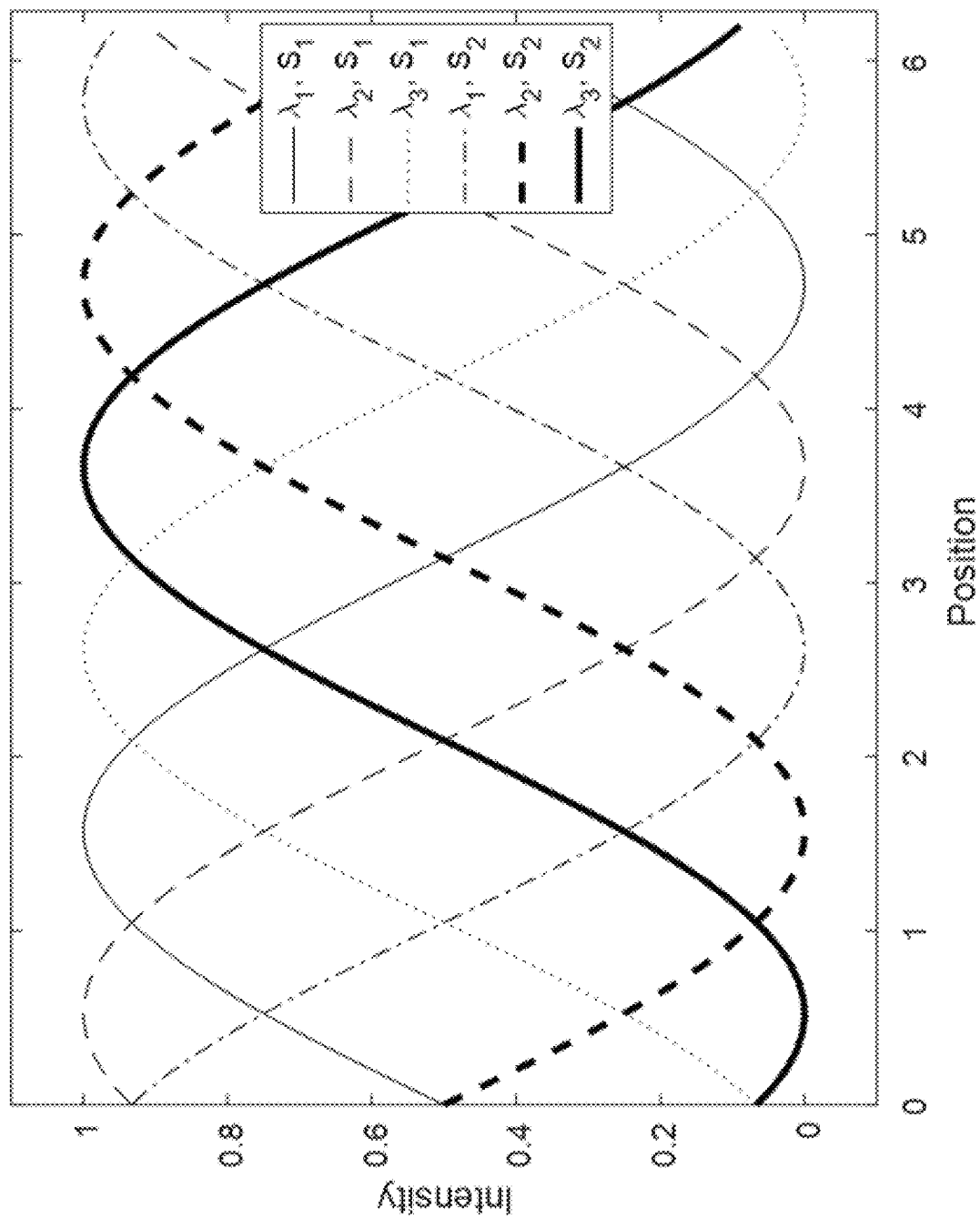
FIG. 5 illustrates plots of intensity versus position for six periodic fringes having the same spatial periodicity but different phases, wavelengths, and polarization states in accordance with an exemplary embodiment.

FIG. 5 illustrates plots of intensity versus position for six periodic fringes having the same spatial periodicity but different phases, wavelengths, and polarization states in accordance with an exemplary embodiment. A six-step phase-shifting algorithm can be used to calculate the depth from the six intensity measurements (similar to Equation (6) and associated description but based on the six intensity values associated with the fringes of FIG. 5). The fringe wavelengths are different from each other and are denoted by wavelengths $\lambda_1$, $\lambda_2$ and $\lambda_3$. The polarization state is denoted by the Stokes vector S1 and S2. The Stokes vector describes the polarization state of incoherent or partially polarized electromagnetic radiation. In this embodiment, the camera is sensitive to the three wavelengths and the two orthogonal polarization states.

Figure 6:
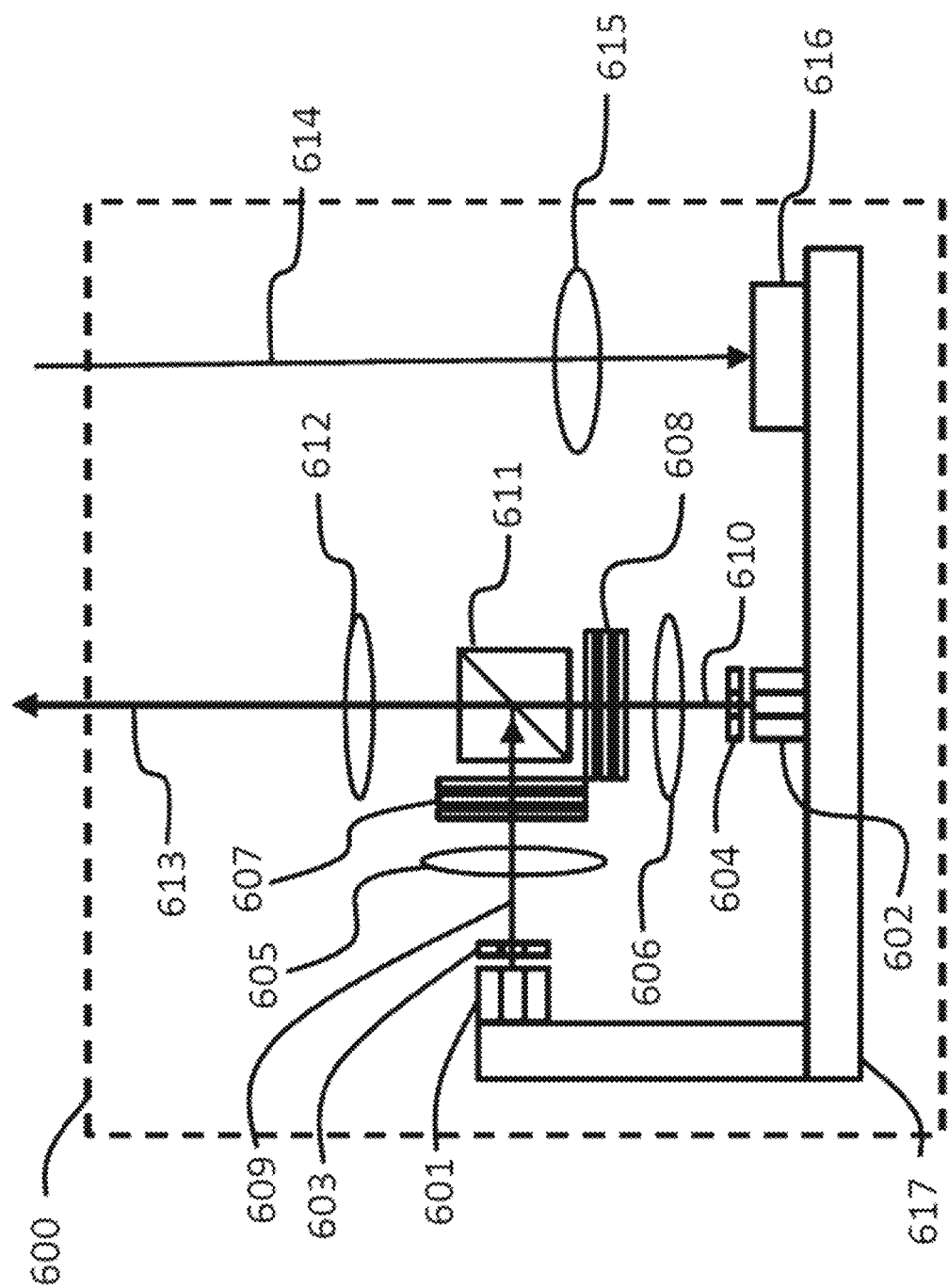
FIG. 6 illustrates a system that can be used to produce three-dimensional images of an object in accordance with another exemplary embodiment.

FIG. 6 illustrates a system 600 that can be used for 3D imaging of an object in accordance with another exemplary embodiment. A source 601 (e.g., a three-laser source) is connected to a controller and power supply 617. The source 601 is capable of producing light at different wavelengths $\lambda_1$, $\lambda_2$ and $\lambda_3$. The output light 609 passes through three polarizers 603. In the exemplary configuration of FIG. 6, another source 602 capable of producing light at the same wavelengths $\lambda_1$, $\lambda_2$ and $\lambda_3$ is connected to the controller and power supply 617. The output of light source 602 passes through three polarizers 604, the output of which (light 610) is orthogonally polarized with respect to the light 609 that is output from the polarizers 603. For example, the light exiting polarizer 603 can be vertically polarized and the light exiting polarizer 604 can be horizontally polarized. Alternatively, the light exiting polarizer 603 can be right-handed circularly polarized and the light exiting polarizer 604 can be left-handed circularly polarized. Yet in another embodiment, the light exiting 603 can be right-handed elliptically polarized and the light exiting 604 can be left-handed elliptically polarized. The output light 609 is collimated by collimation optics 605 and passes through three masks 607 configured to produce three phase-shifted fringes at three different wavelengths. The masks can be fabricated using patterned or etched dichroic filters, where each dichroic filter is designed to operate at the laser wavelength. For example, a dichroic filter is designed to attenuate light of wavelength $\lambda_1$ and to transmit light of wavelengths $\lambda_2$ and $\lambda_3$, so as to produce fringes having wavelength $\lambda_1$. Another dichroic filter is designed to attenuate light of wavelength $\lambda_2$ and to transmit light of wavelengths $\lambda_1$ and $\lambda_3$. Yet another dichroic filter is designed to attenuate light of wavelength $\lambda_3$ and to transmit light of wavelengths $\lambda_1$ and $\lambda_2$. As a result, three fringe patterns corresponding to light of wavelengths $\lambda_1$, $\lambda_2$ and $\lambda_3$ are produced. Similarly, the output light 610 is collimated by collimation optics 606 and passes through three masks 608 configured to produce three phase-shifted fringes at three different wavelengths. The masks can also be fabricated using patterned or etched dichroic filters. The light 609 and 610 are combined by a polarizing beam splitter 611 to form light 613. The light 613, which includes fringes of different color, polarization and phase, passes through a zoom lens 612 which controls the magnification of the fringes and is projected onto an object (not shown). The reflected light 614 is collected by collection optics 615 and detected by an array sensor 616, such as a CCD or a CMOS array with pixelated color filters and polarizers for the wavelengths and polarization states of interest.

One advantage of using polarized light is that it makes it possible to measure high dynamic range objects since different object surfaces depolarize the projected fringes to different degrees. Furthermore, utilizing polarized light enables or improves the determination of material properties of the target object since different materials produce different variations in the reflected polarized light.

While the configuration of FIG. 6 illustrates one example embodiment, it is understood that other variations of the system 600 can be implemented. For example, in some implementations, instead of having two sets of sources 601 and 602, a single source can be used to provide light at different wavelengths of interest. Additionally, as noted in connection with FIG. 3, in some implementations, instead of having three separate light sources to produce light at different wavelengths, a single light source with additional filters can be used to generate light of different wavelengths. It is further understood that in implementations where a single light source is used, the order of wavelength separation and polarization can be reversed if desired. Moreover, while the configuration of FIG. 6 implements the six-fringe pattern of FIG. 5, in some configurations the system 600 can be adapted to project 3 or more fringe patterns. In particular, the determination of phase (and depth) requires at least three intensity measurements (see Equation (5)); thus, only three fringes may be generated and projected onto the object (e.g., fringes having characteristics ($\lambda_1$ $S_1$), ($\lambda_2$ $S_1$), ($\lambda_1$ $S_2$)) to enable the determination of phase/depth. Moreover, in some implementations, more than six fringes can be projected and analyzed to improve the accuracy of measurements.

In some embodiments, the color masks, such 305, 306 and 307 in FIGS. 3 and 607, 608 in FIG. 6, can be binary masks. For example, the binary mask includes regions of high transmission and regions of low transmission, instead of having graded transition regions between high and low transmissions. Such a binary mask is simpler and cheaper to manufacture. A smooth sinusoidal fringe, such as that shown in FIG. 1, can be created by defocusing of optics, for example components 311 in FIGS. 3 and 612 in FIG. 6.

Figure 7:
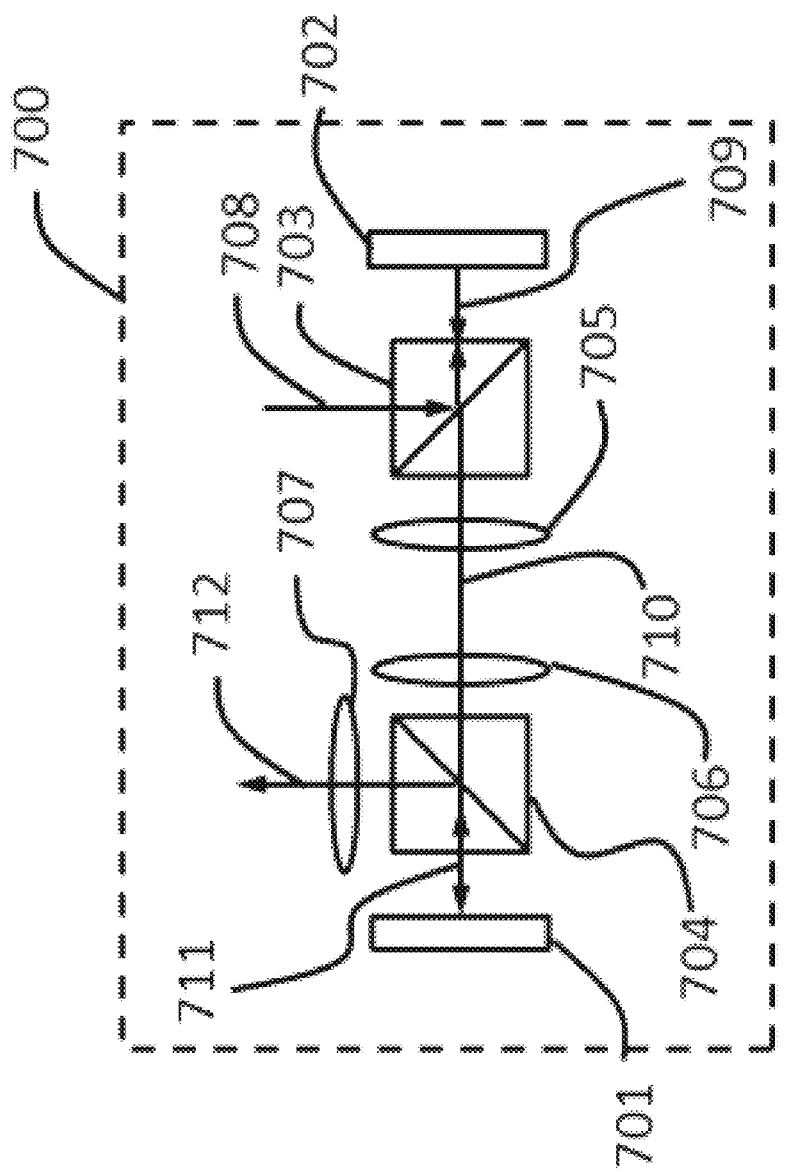
FIG. 7 illustrates a single wavelength polarization display system in accordance with an exemplary embodiment.

In yet another embodiment, a programmable color and polarization projector can be used to create the fringes instead of using a set of masks of different fringe patterns. FIG. 7 illustrates a single wavelength polarization display system 700 in accordance with an exemplary embodiment. The system 700 uses two liquid crystal on silicon (LCoS) devices. LCoS spatial light modulator (SLM) is an electrically programmable device that modulates light according to a fixed pixel pattern. SLMs are typically used to control the incident light in amplitude-only, phase-only or the combination, phase-amplitude; it can control the phase to modulate the polarization on a pixel-by-pixel basis.

The configuration in FIG. 7 has two combined amplitude and phase LCoS panels 701 and 702. The relay optics, 705 and 706, image the first LCoS, 702, to the second LCoS, 701, with pixel-to-pixel overlap. Two LCoS panels are synchronized to modulate the angle of polarization and degree of polarization of the light, as well as the intensity of each pixel. Incoming polarized light 708 is reflected by the beam splitter 703 onto LCoS, 702. The light 709 reflected from LCoS 702 passes through the beam splitter 703 and the relay lens 705, and the light 710 is relayed onto another beam splitter 704 and onto another LCoS, 701. After reflection from the second LCoS 701 and beam splitter 704, the light 712 passes through projection optics 707. By controlling the retardance at each pixel using the two LCoS devices, a programmable fringe pattern at a specific wavelength can be generated using the system 700. Two (or more) systems 700 can be used to produce programmable fringe patterns at two or more wavelengths. In the example configuration of FIG. 7, the beam splitters and the spatial light modulators are positioned on the optical axis of the system, and beam splitter 704 is configured to produce the set of fringe patterns along a direction that is substantially perpendicular to the optical axis.

Figure 8:
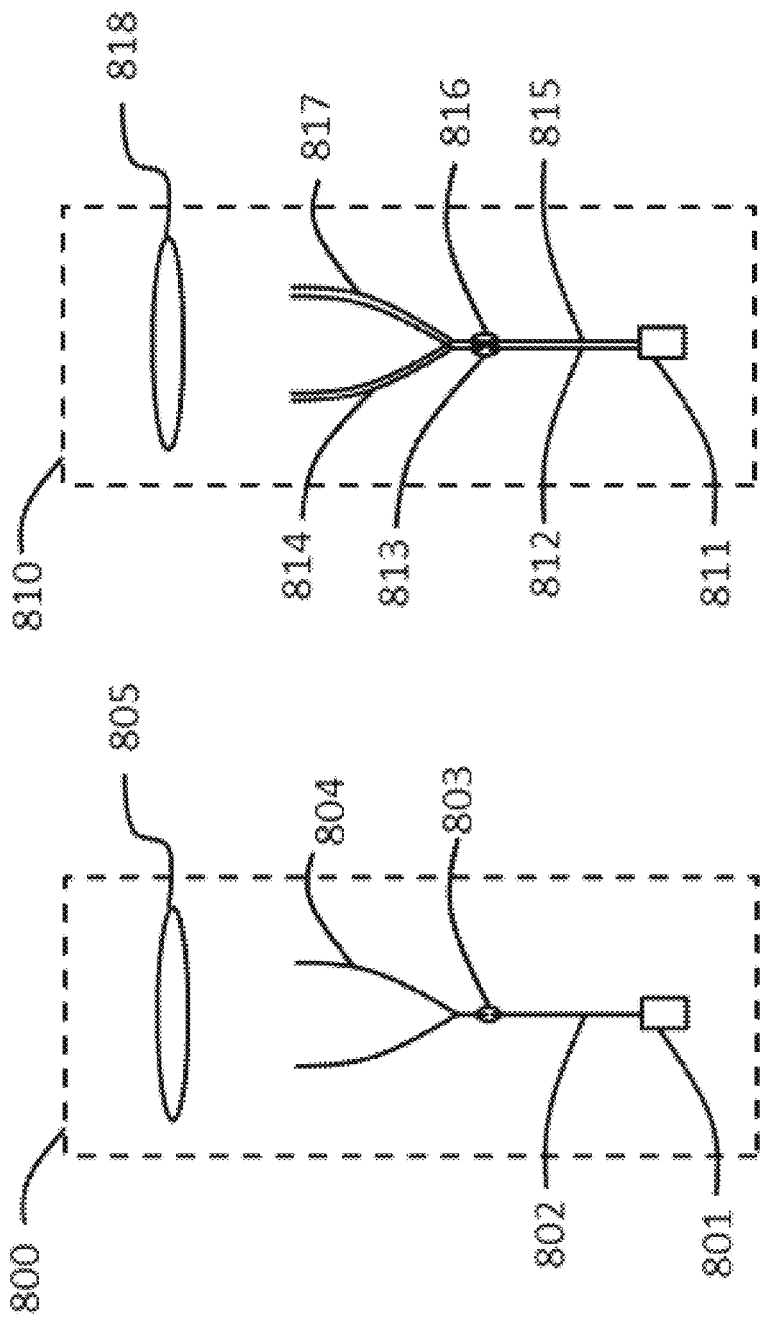
FIG. 8($a$) illustrates a fringe production configuration that uses optical fibers in accordance with an exemplary embodiment.

In another embodiment, the fringe can be generated by the output of two optical fibers in a system 800 shown in FIG. 8(a). A laser source 801 is coupled to an optical fiber 802. The fiber 802 is coupled to a 50/50 fiber splitter 804 at location 803. The outputs of the two fibers pass through a lens 805, and the projected light is a set of fringes similar to those shown in FIG. 1. Similarly, FIG. 8(b) illustrates another system 810 having two lasers of two different wavelengths. The lasers 811 are coupled to two optical fibers 812 and 815, which are coupled to two 50/50 fiber splitters 814 and 817 at locations 813 and 816, respectively. The outputs of the splitters are closely spaced next to each other and pass through a lens 818. The projected light includes two sets of fringes with two wavelengths. By varying the length of one arm of the fiber splitter, the phase of the fringe can be changed. In some embodiments, the lenses 805 and 818 may not be necessary. Mathematically, the Fourier transform of two point sources, representing plus and minus components of a spatial frequency, is a sinusoidal fringe pattern. A lens can be utilized to perform the Fourier transform, which results in a set of fringes with a fixed spatial frequency. Alternatively, the far field pattern, i.e., without a lens, is also a good approximation of the Fourier transform. The configurations of FIGS. 8(a) and 8(b) can introduce differing polarization states of light, as described earlier, through polarizers that are, for example, placed between the light source and fiber splitters, or, more generally between the light source and the projection lens. Additional fringes can be produced by duplicating the systems 800 and/or 810, i.e., by using additional fibers and lasers.

Figure 9:
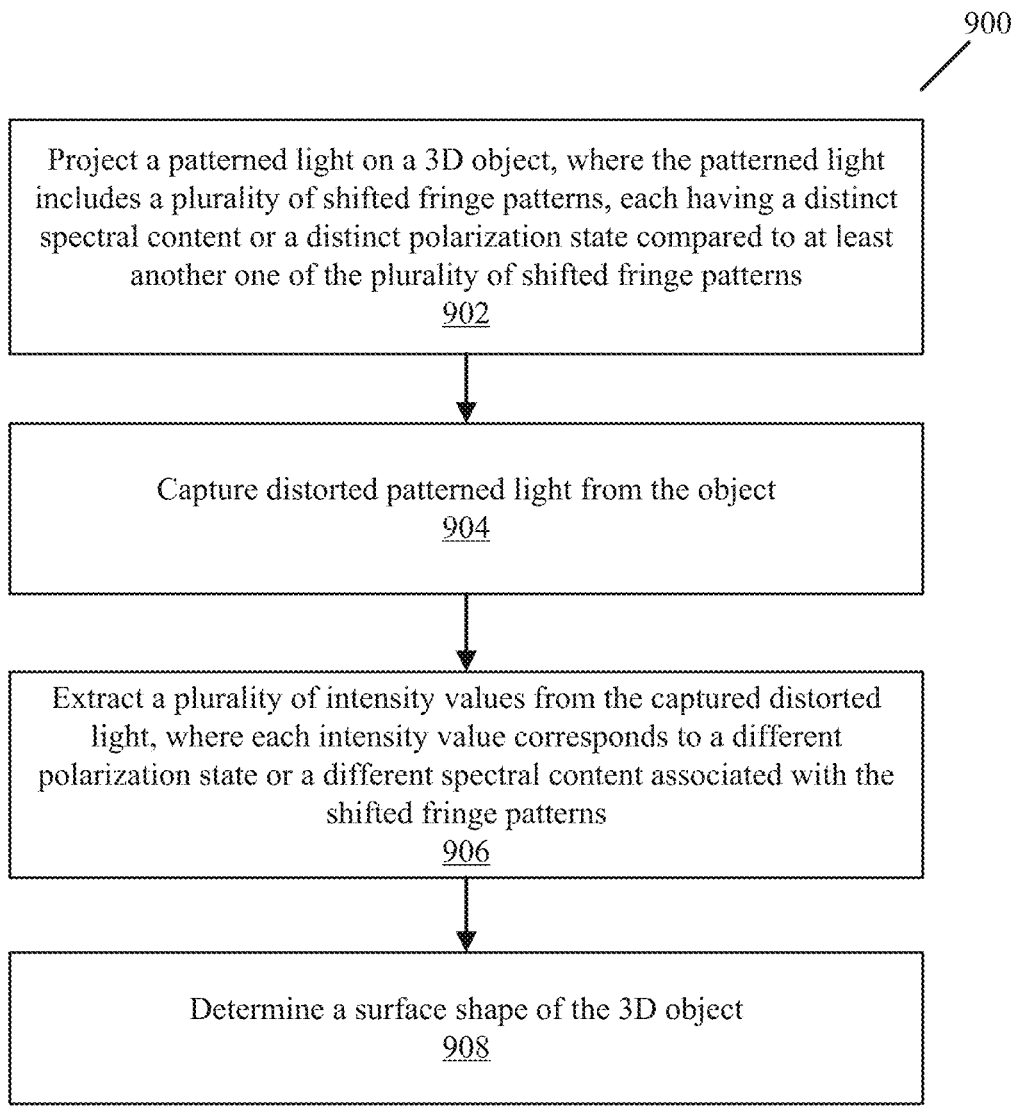
FIG. 9 is a flow diagram illustrating a set of operations that can be carried out to determine one or more characteristics of a three-dimensional (3D) object in accordance with an exemplary embodiment.

FIG. 9 illustrates a set of operations 900 that can be carried out to determine one or more characteristics of a three-dimensional object in accordance with an exemplary embodiment. At 902, a patterned light is projected on the 3D object, where the patterned light includes a plurality of shifted fringe patterns, each having a distinct spectral content or a distinct polarization state compared to at least another one of the plurality of shifted fringe patterns. For example, the patterned light can be generated using any of the exemplary systems described in connection with FIG. 3, 5, 6, 7 or 8. At 904, the distorted patterned light that is received from the object is captured. At 906, a plurality of intensity values are captured from the captured distorted light. Each intensity value corresponds to a different polarization state or a different spectral content associated with the shifted fringe patterns. At 908, one or more surface characteristic of the 3D object, such as the surface shape of the 3D object is determined. In some embodiments, the above method includes determining the surface properties from the extracted patterned light. In another embodiment, the captured distorted light includes a single shot or a single captured frame, and determining the surface shape of the 3D objects is carried out using the single shot or the single captured frame. In yet another exemplary embodiment, the 3D object is a moving object, and the captured distorted light is reflected from the moving 3D object. In still another exemplary embodiment, the patterned light includes at least three shifted fringe patterns.

One aspect of the disclosed embodiments relates to a system for determining a physical characteristic of a three dimensional (3D) image. The system includes a projection subsystem that includes one or more light sources configured to produce multiple light beams, where each light beam has a particular spectral content and a particular polarization state. The projection subsystem further includes a plurality of masks positioned to receive the light beams, where each mask includes an alternating pattern to modify an intensity or a phase of one of the light beams while allowing the remaining light beams to propagate through the mask without undergoing a phase shift. The projection subsystem further includes projection optics positioned to receive at least three of the multiple light beams after propagation through the plurality of masks, and to simultaneously project at least three fringe patterns. Each projected fringe pattern is phase-shifted with respect to all other projected fringe patterns, and each projected fringe pattern includes light that has a different polarization state or a different spectral content than other projected fringe patterns. The above noted system also includes a detection subsystem that includes a camera unit configured to simultaneously receive light associated with the at least three fringe patterns upon reflection from an object, and to produce at least three separate intensity values. The detection subsystem also includes a processing unit coupled to the camera unit configured to receive the at least three separate intensity values from the camera unit and to determine one or both of a phase or a depth information associated with the object.

In one exemplary embodiment, the one or more light sources include three light producing devices, where each light producing device is operable to produce light at a particular wavelength that is non-overlapping with light produced by other light producing devices. In another exemplary embodiment, the one or more light producing devices include at least one of: a laser, or an LED. In yet another exemplary embodiment, the projection subsystem includes one or more polarizers, where each polarizer is configured to produce polarized light having a polarization state that is different from polarization state of light produced by other polarizers. In one exemplary embodiment, at least one of the plurality of masks is a binary mask. In still another exemplary embodiment, the projection optics is configured to project an out-of-focus image of the binary mask. In still another exemplary embodiment, at least one of the plurality of masks is an interference filter.

According to an exemplary embodiment, the spectral contents of at least one of the projected fringe patterns is in the near infrared region. In another exemplary embodiment, a separation between the spectral contents of the projected fringe patterns is in the range 5 to 50 nm. In another exemplary embodiment, the projected fringe patterns include a first projected fringe pattern having a first spectral content, a second projected fringe pattern having a second spectral content, and a third projected fringe pattern having a third spectral content. In yet another exemplary embodiment, the projected fringe patterns include a first projected fringe pattern having a first spectral content and a first polarization state, a second projected fringe pattern having a second spectral content and a second polarization state, and a third projected fringe pattern having one of: (a) the first spectral content and the second polarization state, or (b) the second spectral content and the first polarization state.

In one exemplary embodiment, the projection optics is configured to simultaneously project six fringe patterns. In another exemplary embodiment, the projection system includes a digital mirror device, a liquid crystal device, or a liquid crystal on silicon. In yet another exemplary embodiment, the particular polarization state is one of: a left-handed circular polarization state, a right-handed circular polarization state, a left-handed elliptical polarization state, a right-handed elliptical polarization state, a vertical polarization state, or a horizontal polarization state. According to another exemplary embodiment, the system for determining a physical characteristic of a three dimensional (3D) image further includes a polarizing beam splitter positioned between the light source and the projection optics, configured to receive light with different polarization states and to combine light with different polarization states. In still another exemplary embodiment, the processing unit includes a microprocessor and a memory including microprocessor executable code that upon execution by the microprocessor causes the processor unit to determine the phase associated with the object based on an inverse tangent relationship of the at least three separate intensity values. According to one exemplary embodiment, the microprocessor executable code upon execution by the microprocessor causes the processor unit to determine the depth based in-part on the determined phase and a spacing associated with fringes of the fringe patterns.

Another aspect of the disclosed embodiments relates to a system for producing optical fringe patterns that includes one or more light sources coupled to one or more optical fibers, and one or more splitters coupled to each optical fiber. Each splitter is coupled to two output fibers of different lengths to simultaneously produce a plurality of fringe patterns at a particular distance from an end of the two output optical fibers. Moreover, each fringe pattern is phase-shifted with respect to all other fringe patterns, and each fringe pattern includes light that has a different polarization state or a different spectral content than other projected fringe patterns. In one exemplary embodiment, the above system includes at least one projection lens to enable projection of the plurality of fringe patterns onto an object.

Another aspect of the disclosed embodiments relates to another system for producing optical fringe patterns that includes a first beam splitter configured to receive light from a light source, a first spatial light modulator positioned to receive the light after reflection from the first beam splitter and to produce a first reflected light that is modulated in one or both of space and amplitude. The system also includes a second beam splitter configured to receive the first reflected light after traversal through the first beam splitter, and a second spatial light modulator positioned to receive light after traversal through the first beam splitter and to produce a second reflected light that is modulated in one or both of space and amplitude, where the second beam splitter is configured to produce a set of fringe patterns, and each fringe pattern has a particular phase, polarization or intensity characteristic that is different from another one of the fringe patterns. In one exemplary embodiment, the system further includes one or more relay lenses positioned between the first and the second beam splitters. In another exemplary embodiment, the beam splitters are dichroic prisms. In another exemplary embodiment, at least one of the first or the second spatial light modulators is a programmable liquid crystal on silicon (LCoS) device that includes a plurality of pixels; the LCoS device is configured to be electrically controlled to allow modulation of light that is incident thereupon on a pixel-by pixel basis. In yet another exemplary embodiment, the above noted system also includes a projection lens positioned to receive the set of fringe patterns produced by the second beam splitter and to project the set of fringes. In still another exemplary embodiment, the first and the second beam splitters and the first and the second spatial light modulators are positioned on an optical axis of the system, where the second beam splitter is configured to produce the set of fringe patterns along a direction that is substantially perpendicular to the optical axis.

It is understood that the various disclosed embodiments may be implemented individually, or collectively, in devices comprised of various hardware and/or software modules and components. These devices, for example, may comprise a processor, a memory unit, an interface that are communicatively connected to each other, and may range from desktop and/or laptop computers, to mobile devices and the like. The processor and/or controller can be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Some of the disclosed devices or modules can be implemented as hardware, software, or combinations thereof. For example, a hardware implementation of electronic devices can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Various information and data processing operations described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A system for producing optical fringe patterns, comprising:
   a first beam splitter configured to receive light from a light source;
   a first spatial light modulator positioned to receive the light after reflection from the first beam splitter and to produce a first reflected light that is modulated in one or both of space and amplitude;
   a second beam splitter configured to receive the first reflected light after traversal through the first beam splitter; and
   a second spatial light modulator positioned to receive light after traversal through the first beam splitter and to produce a second reflected light that is modulated in one or both of space and amplitude, wherein the second beam splitter is configured to produce a set of fringe patterns, wherein each fringe pattern has a particular phase, polarization or intensity characteristic that is different from another one of the fringe patterns.

2. The system of claim 1, further comprising one or more relay lenses positioned between the first and the second beam splitters.

3. The system of claim 1, wherein at least one of the first or the second spatial light modulators is a programmable liquid crystal on silicon (LCoS) device comprising a plurality of pixels, the LCoS device configured to be electrically controlled to allow modulation of light that is incident thereupon on a pixel-by pixel basis.

4. The system of claim 1, further comprising a projection lens positioned to receive the set of fringe patterns produced by the second beam splitter and to project the set of fringes.

5. The system of claim 1, wherein the first and the second beam splitters and the first and the second spatial light modulators are positioned on an optical axis of the system, and wherein the second beam splitter is configured to produce the set of fringe patterns along a direction that is substantially perpendicular to the optical axis.

6. The system of claim 1, further including the light source.

7. The system of claim 6, wherein the light source operable at a single wavelength.

8. The system of claim 6, wherein the light source includes one of: a laser, or a light emitting diode (LED).

9. The system of claim 1, wherein the first and the second spatial light modulators are configured to modulate one or both of the amplitude or phase of the light incident thereon, and wherein each spatial light modulator includes a plurality of pixels and is operable to control the amplitude or the phase of the light incident thereon on a pixel-by-pixel basis.

10. The system of claim 1, wherein the first or the second spatial light modulators are electrically controllable to modulate the light incident thereon according to a fixed pattern.

11. The system of claim 1, wherein the first and the second spatial light modulators are synchronized to modulate an angle of polarization and a degree polarization of light that is incident on the first and the second spatial light modulators.

12. The system of claim 1, wherein the first and the second spatial light modulators include a plurality of pixels, and wherein a retardance associated with each pixel can be controlled.

13. The system of claim 1, wherein the first and the second beam splitters, and the first and the second spatial light modulators are part of a first projection system that is operable at a first wavelength, the system includes a second projection system that includes two beam splitters and two spatial light modulators, wherein the second projection system is operable at a second wavelength and is configured to produce an additional set of fringe patterns, wherein each fringe pattern in the additional set of fringe patterns has a particular phase, polarization or intensity characteristic.

14. The method of claim 1, wherein each fringe pattern has a polarization state that is selected from one of the following polarization states:
   a left-handed circular polarization state,
   a right-handed circular polarization state,
   a left-handed elliptical polarization state,
   a right-handed elliptical polarization state,
   a vertical polarization state, or
   a horizontal polarization state.

15. The system of claim 1, further comprising a detection subsystem, comprising:
   a camera unit configured to simultaneously receive light associated with the set of fringe patterns upon reflection from an object, and to produce at least three separate intensity values; and
   a processing unit coupled to the camera unit configured to receive the at least three separate intensity values from the camera unit and to determine one or both of a phase or a depth information associated with the object.

16. The system of claim 15, wherein the processing unit comprises a microprocessor and a memory including microprocessor executable code that upon execution by the microprocessor causes the processor unit to determine the phase associated with the object.

17. The system of claim 16, wherein determination of the phase associated with the object is based on an inverse tangent relationship of the at least three separate intensity values.

18. The system of claim 16, wherein the microprocessor executable code upon execution by the microprocessor causes the processor unit to determine the depth based at least in-part on the determined phase and a spacing associated with fringes of the set of fringe patterns.

* * * * *